United States Patent [19]

Douglass et al.

[11] Patent Number: 5,513,235
[45] Date of Patent: *Apr. 30, 1996

[54] INTEGRATED CIRCUIT THERMOMETER

[75] Inventors: James M. Douglass, Dallas County; Gary V. Zanders, Dallas; Robert D. Lee, Denton, all of Tex.

[73] Assignee: Dallas Semiconductor Corporation, Dallas, Tex.

[*] Notice: The term of this patent shall not extend beyond the expiration date of Pat. No. 5,388,134.

[21] Appl. No.: 327,736

[22] Filed: Oct. 24, 1994

Related U.S. Application Data

[62] Division of Ser. No. 13,883, Feb. 5, 1993, Pat. No. 5,388,134.

[51] Int. Cl.[6] .................................................. G01K 7/32
[52] U.S. Cl. ..................... 377/25; 374/170; 374/102; 364/557; 377/49
[58] Field of Search .................. 377/25, 49; 374/102, 374/170; 364/557

[56] References Cited

U.S. PATENT DOCUMENTS

| | | | |
|---|---|---|---|
| 4,150,573 | 4/1979 | Iinuma et al. | 377/25 |
| 4,505,599 | 3/1985 | Nonaka | 374/170 |
| 4,551,031 | 11/1985 | Ishikawa et al. | 377/25 |
| 4,602,871 | 7/1986 | Hanaoka | 377/25 |
| 4,658,407 | 4/1987 | Iwama | 364/557 |
| 4,771,393 | 9/1988 | Ishida et al. | 374/170 |
| 4,782,445 | 11/1988 | Pasquini | 377/25 |
| 4,987,579 | 1/1991 | Yoshinaka et al. | 377/25 |
| 5,388,134 | 2/1995 | Douglass et al. | 377/25 |

Primary Examiner—John S. Heyman
Attorney, Agent, or Firm—Jenkens & Gilchrist

[57] ABSTRACT

An integrated circuit temperature detector (thermometer) uses a temperature dependent oscillator to count up to a fixed number and thereby generate a time interval indicative of the temperature (a temperature-to-time converter). The time-to-number converter provides a numeric temperature output. Counting oscillations of a relatively temperature independent oscillator for the time interval may digitize the temperature measurement. Calibration and successive approximation iterations permit simple hardware to achieve good accuracy.

13 Claims, 6 Drawing Sheets

THERMISTOR BRIDGE SENSOR

FIG. 1A
(PRIOR ART)

Δ USE TEMPERATURE SENSOR

INTEGRATED CIRCUIT THERMOMETER

CROSS-REFERENCE TO RELATED APPLICATIONS

This is a continuation of U.S. application Ser. No. 08/013,883, now U.S. Pat. No. 5,388,134, filed Feb. 5, 1993. The following U.S. patent application assigned to the assignee of the present application disclose related subject matter: Ser. No. 08/299,031, filed Aug. 31, 1994, continuation of Ser. No. 07/725,793, filed Jul. 9, 1991, now abandoned.

BACKGROUND AND SUMMARY

The present invention relates to electronic devices, and, more particularly, to temperature detection by integrated circuits.

Figure 1A:
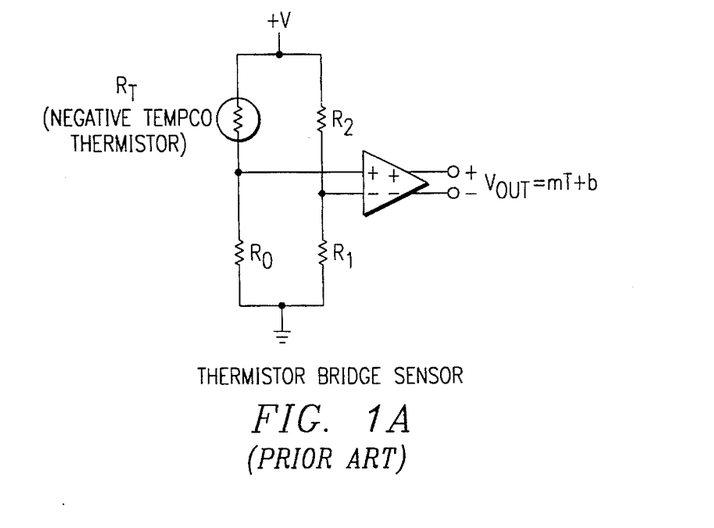
FIGS. 1a–b show known temperature detectors.
Figure 1B:
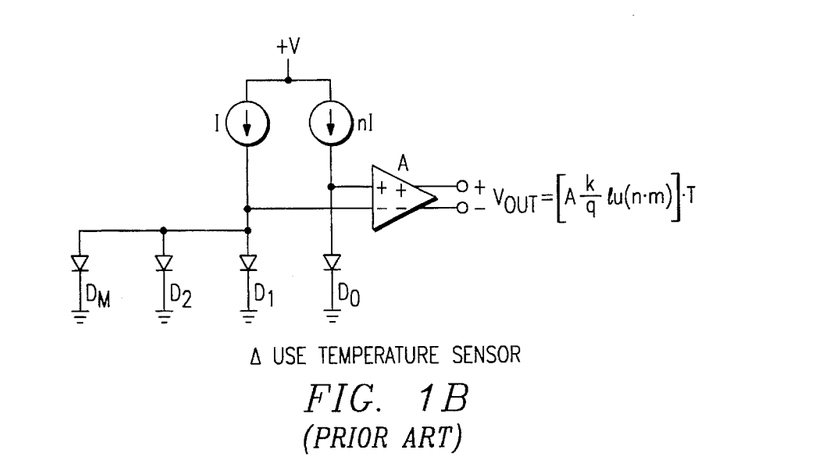

Various manufacturing processes require temperature monitoring for process control, and automatic (electronic) process control demands electronic temperature measurement. Further, microcontrollers and microprocessors require temperature measurements be available in digital format. However, current electronic circuits which measure temperature often consist of integrated circuits teamed with discrete temperature sensitive items such as thermistors and are inherently analog circuits. For example, FIG. 1a shows a thermistor bridge temperature sensor, and FIG. 1b shows a base-emitter voltage drop difference temperature sensor. An additional analog-to-digital converter would be needed to provide a digital output.

Many applications would benefit from a temperature detector (thermometer) implemented as a simple integrated circuit which requires no external components and which allows the temperature to be directly read digitally from the circuit. Further, such a self-contained temperature detector would permit integration into other integrated circuits as a sort of standard cell.

The present invention provides an integrated circuit temperature detector which runs an oscillator with a large temperature dependency up to a fixed count to thereby generate a time interval indicating temperature. The time interval may be used to gate an oscillator with a small temperature dependence to generate an output count (number of oscillations) varying with temperature (e.g., approximately linearly). This provides for simple calibration due to the linearity and yields a direct digital expression of temperature. Alternative temperature detectors could use other temperature sensitive time interval generators such as an integrator of a temperature sensitive current. Digital temperature measurement permits use of the measurement as a direct input to a microcontroller or, more simply, as an address for a ROM to read out desired process control parameters.

BRIEF DESCRIPTION OF THE DRAWINGS

The present invention will be described with reference to the accompanying drawings, which are schematic for clarity.

DESCRIPTION OF THE PREFERRED EMBODIMENTS

Temperature Measurement

Figure 2:
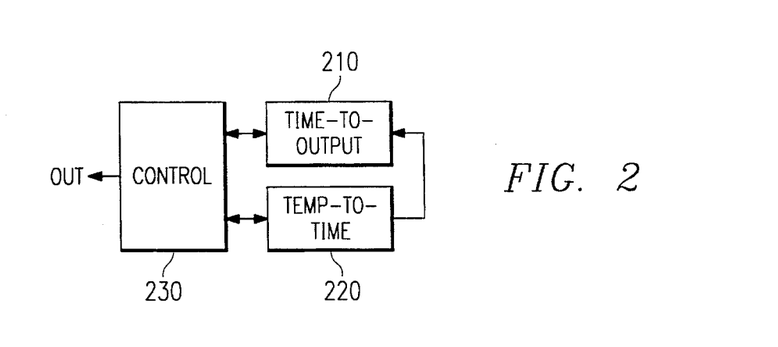
FIG. 2 is a functional/structural block circuit diagram of preferred embodiment temperature detectors.

FIG. 2 illustrates in functional block form preferred embodiment temperature detectors (thermometers), generally denoted by reference numeral 200, which include timing circuit 210, temperature sensor 220, and control circuit 230. Timing circuit 210 has a much smaller temperature dependence than temperature sensor 220. Basically, temperature sensor 220 provides a time interval dependent upon temperature, and this time interval controls (such as the interval from turning on until turning off) timing circuit 210. That is, temperature sensor 220 provides a temperature-to-time converter. Timing circuit 210 produces an output indicative of the duration of its activity which thus correlates with temperature and may have any desired format. For example, timing circuit 210 could provide a digital output and thus would essentially be a time-to-count converter. Various implementations of blocks 210 and 220 appear in the following embodiments and include both the use of a continuously running timing circuit 210 with a reset as the "turning on and turning off" and the use of an only-intermittently active timing circuit 210 to limit power consumption for battery powered operation. Similarly, temperature sensor circuit 220 may be only intermittently active in order to both conserve power and avoid self-heating problems. Control block 230 provides activation and synchronization.

When temperature sensor 220 has an output depending linearly upon temperature, then the output of timing circuit 210 will also depend linearly on temperature and simplify the circuitry and its calibration.

In one sense, temperature sensor 220 amounts to a delay line with a temperature dependent delay, and timing circuit 210 amounts to a converter of time intervals to signals of another format. Timing circuit 210 could have large temperature dependence, and detector 200 would then essentially operate on the difference in temperature coefficients.

Linear Approximation Detector

Figure 3:
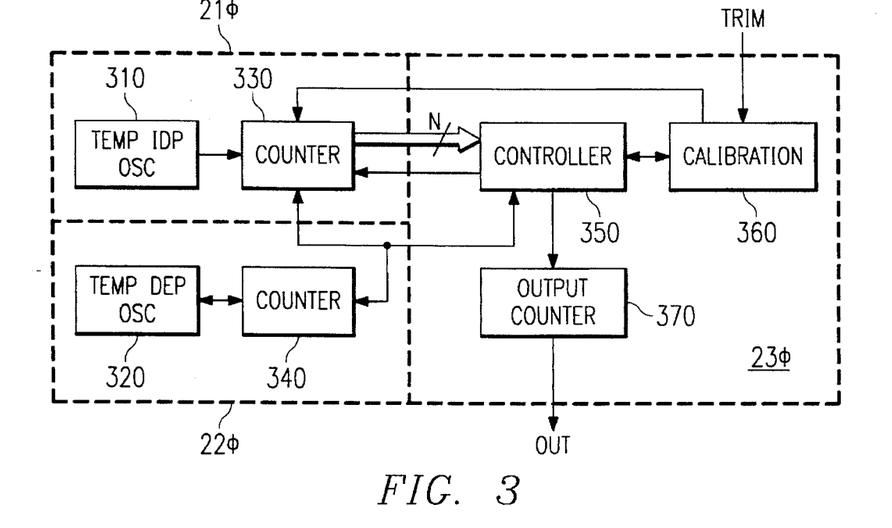
FIG. 3 shows a first preferred embodiment detector.
Figure 4:
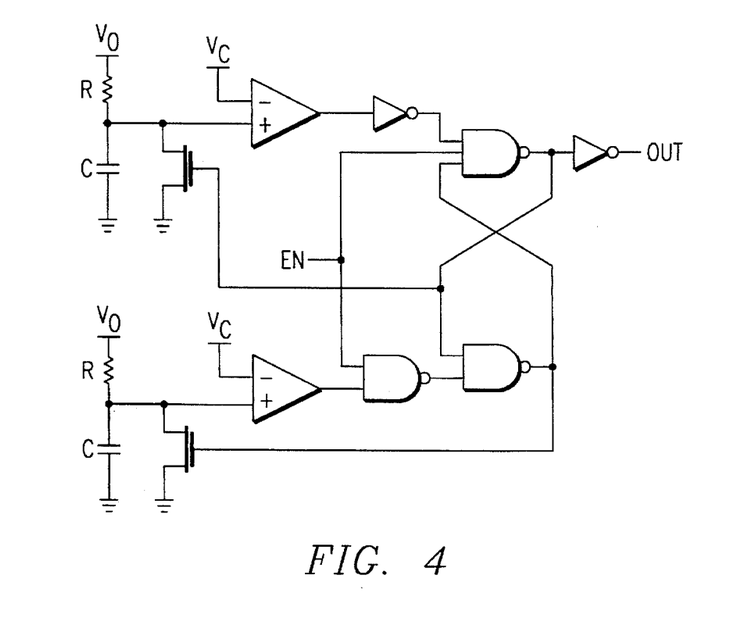
FIG. 4 illustrates an oscillator used in the detector of FIG. 3.

FIG. 3 illustrates the first preferred embodiment temperature detector, generally denoted by reference numeral 300, and including temperature insensitive oscillator 310, temperature sensitive oscillator 320, counter 330, circular counter 340, controller 350, intercept and slope registers 360 for calibration, and output counter 370. Counter 330 counts the oscillations of oscillator 310, and counter 340 counts the oscillations of oscillator 320. Oscillators 310 and 320 each have the structure shown in FIG. 4 but with different types of resistors which leads to their differing temperature dependencies. The period, t, of oscillation of the RC oscillator of FIG. 4 equals:

$$t = 2RC \ln[V_0/(V_0 - V_C)] + 2K$$

where K is the propagation delay through one of the comparators and NAND-gate flip-flop structures plus overdrive time due to finite gain and slew rate in the comparators. Of course, R, C, $V_0$, $V_C$, and K all depend upon temperature. However, if $V_C$ is taken to be a fraction of $V_0$, such as by use of a voltage divider, then the natural logarithm will be independent of both $V_0$ and $V_C$. The linear approximation for the resistance R of the resistor is $$R(T)=R(T_0)[1+\alpha\Delta T]$$

where $R(T_0)$ is the resistance at a reference temperature $T_0$, $\alpha$ is the temperature coefficient of resistance (TCR), and $\Delta T$ equals $T-T_0$. Now $\alpha$ roughly equals +5300 parts per million per degree Celsius (ppm/°C.) for n-well diffused resistors in silicon integrated circuits, but has a value of roughly 850 ppm/°C. for standard polysilicon resistors. The capacitance similarly has a temperature coefficient on the order of +100 ppm/°C., and the propagation delay for CMOS devices has a temperature coefficient of roughly 1500 ppm/°C.

Oscillator 310 employs polysilicon resistors and oscillator 320 uses diffused resistors; this differences provides the temperature sensitivity characterizations of the oscillators. Indeed, oscillator 320 slows down more than oscillator 310 as temperature increases due to its greater TCR resistors. Also, oscillators 310 and 320 each oscillate at about 200 KHz, so the period is on the order of 5 microseconds (μs) and this makes the propagation delay K, which is roughly 100 nanoseconds (ns), small compared to the RC term in the oscillation period expression.

Oscillators 310 and 320 run continuously, and detector 300 measures temperature roughly as follows. For simplicity, first presume counter 330 contains an initial count of 0 and counter 340 is initially loaded with a count of N, which is on the order of 1000. Counter 340 will count down to 0 and this will generate a disable signal for counter 330 to stop counting until cleared and reenabled. Now the time required for counter 340 to count N oscillations from oscillator 320 equals $$N\{2R_{HI}(T)C_{HI}(T)\ln[V_0/(V_0-V_C)]+2K_{HI}(T)\}=Nt_{HI}(T)$$

where the subscript HI indicates oscillator 320 with a high temperature dependence. During this time interval of length $Nt_{HI}(T)$ counter 330 has counted a total of M(T) counts where $M(T)=Nt_{HI}(T)/t_{LO}(T)$ with $t_{LO}(T)$ the period of oscillator 310 which has a low temperature dependence. The propagation delays are small compared to the oscillator periods, so their temperature variation can be ignored. And the temperature dependence of the capacitance is the same for both oscillators and effectively cancels out. Thus choosing resistor $R_{LO}$ of oscillator 310 with a small TCR implies that only the temperature variation of $R_{HI}$ of oscillator 320 need be considered and M(T) has the form:

$$M(T)=N\{R_{HI}[1+\alpha\Delta T]C_{HI}\ln[V_0/(V_0-V_C)]+K_{HI}\}/\{R_{LO}C_{LO}\ln[V_0/(V_0-V_C)]+K_{LO}\}$$

where all of the parameters are temperature independent. This shows that M(T) depends linearly on T under these approximations.

The number of counts in counter 330 when counter 340 counts down to 0 depends upon temperature and increases with increasing temperature. For example, with diffused and polysilicon resistors in oscillators 320 and 310, respectively, both oscillators running at roughly 200 KHz, and N about 1000, M(T) varies by about 5 counts per degree Celsius and $M(T_0)$ equals about 1000. And counter 340 takes about 5 milliseconds to count down from 1000 to 0, so a measurement cycle takes a little more than 5 milliseconds.

Figure 5:
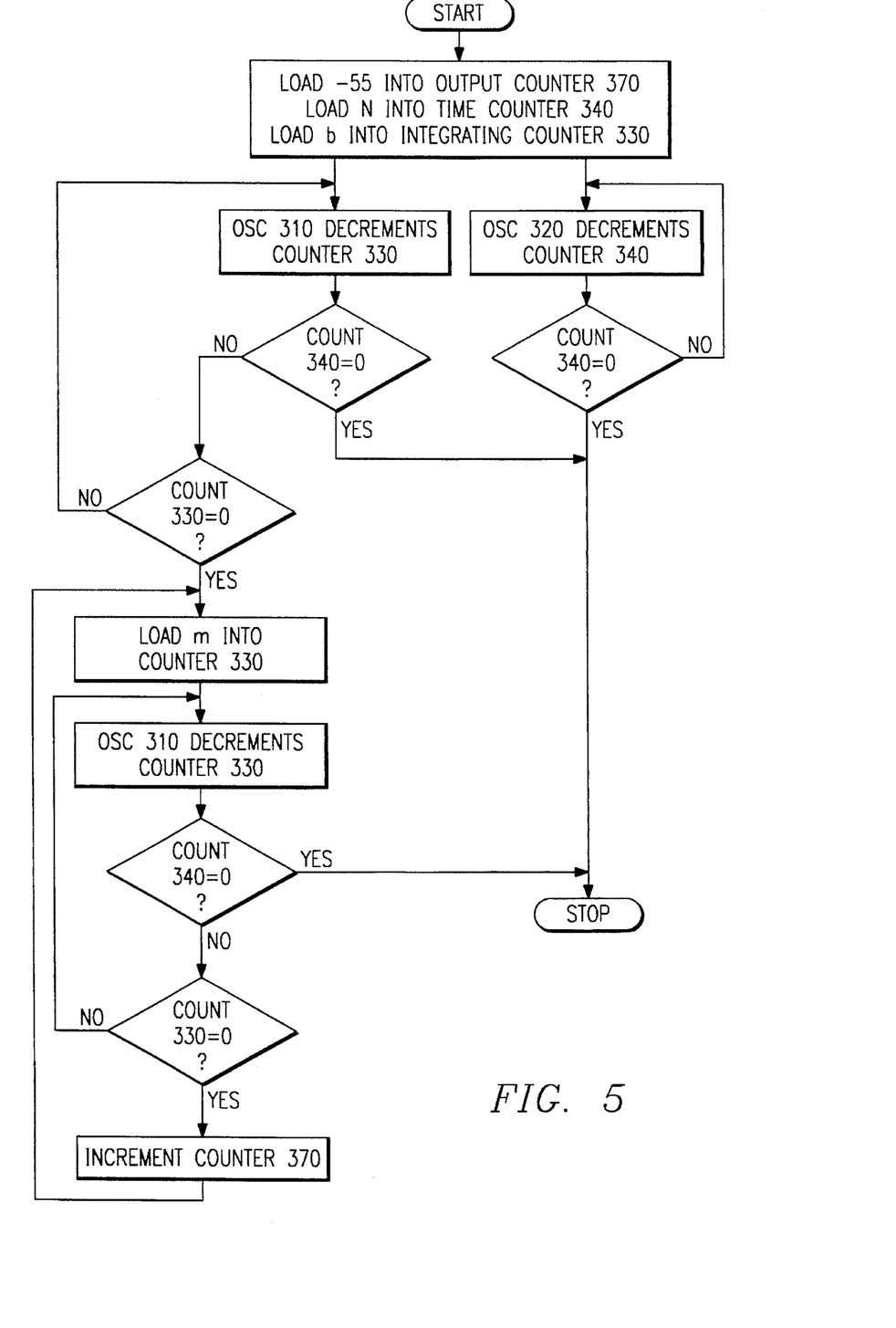
FIG. 5 is a flow chart illustrating operation of the detector of FIG. 3.

Detector 300 does not directly use a total number of counts in counter 330, but rather makes repetitive count downs with counter 330 to increment the output temperature in register 370 and thereby directly read out degrees Celsius over a range of –55° C. to 125° C. as illustrated in the flow chart of FIG. 5. Indeed, registers 360 contain a constant b for the count when the temperature is –55° C. and a constant m for the ratio of counts to degrees. Constants b and m are determined empirically during a calibration, and in the foregoing example with the reference temperature $T_0$ equal 20° C., b would equal 625 and m would equal 5. The flow in FIG. 5 proceeds as follows. First, counters 330 and 340 are initialized at b and N, and counter 370 has –55 loaded. Then the counters 330 and 340 start counting down oscillations of oscillators 310 and 320. Controller 350 monitors the count in counter 330 and when the count reaches 0, controller 350 loads counter 330 with m (which is stored in registers 360). If the temperature is –55° C., then at this time counter 340 will reach 0 and stop counter 330 and the –55° C. entry in counter 370 will be available as the temperature. However, if the temperature is greater than –55° C., then counter 340 has not yet reached 0 and counter 330 continues counting oscillations of oscillator 310. When counter 330 again reaches 0, controller 350 adds 1 to counter 370 (so the temperature entry is now –54° C.) and reloads counter 330 with m. This counting down from m repeats with an accompanying increment in counter 370 until counter 340 reaches 0. When counter 340 reaches 0 the correct temperature will be in counter 370, and count reaching 0 signal drives counter 370 to latch the temperature.

Once the count in counter 340 has reached 0, the next temperature measurement cycle could immediately begin or could be delayed and oscillator 320 turned off to conserve power. Oscillator 310 could provide a crude time keeping which triggers another measurement cycle as determined by controller 350.

The foregoing example with m equal to 5 does not provide much precision, but simply using a large N, such as 1,000,000, would increase m to about 5,000 and yield greater precision. Note that N equal to 1,000,000 means a measurement lasting on the order of 1 second for 1 MHz oscillators. However, the size of the counters may become awkward for large N, and nonlinearities previously ignored would no longer be negligible for a high precision situation.

Quadratic Approximation Detector

Figure 6:
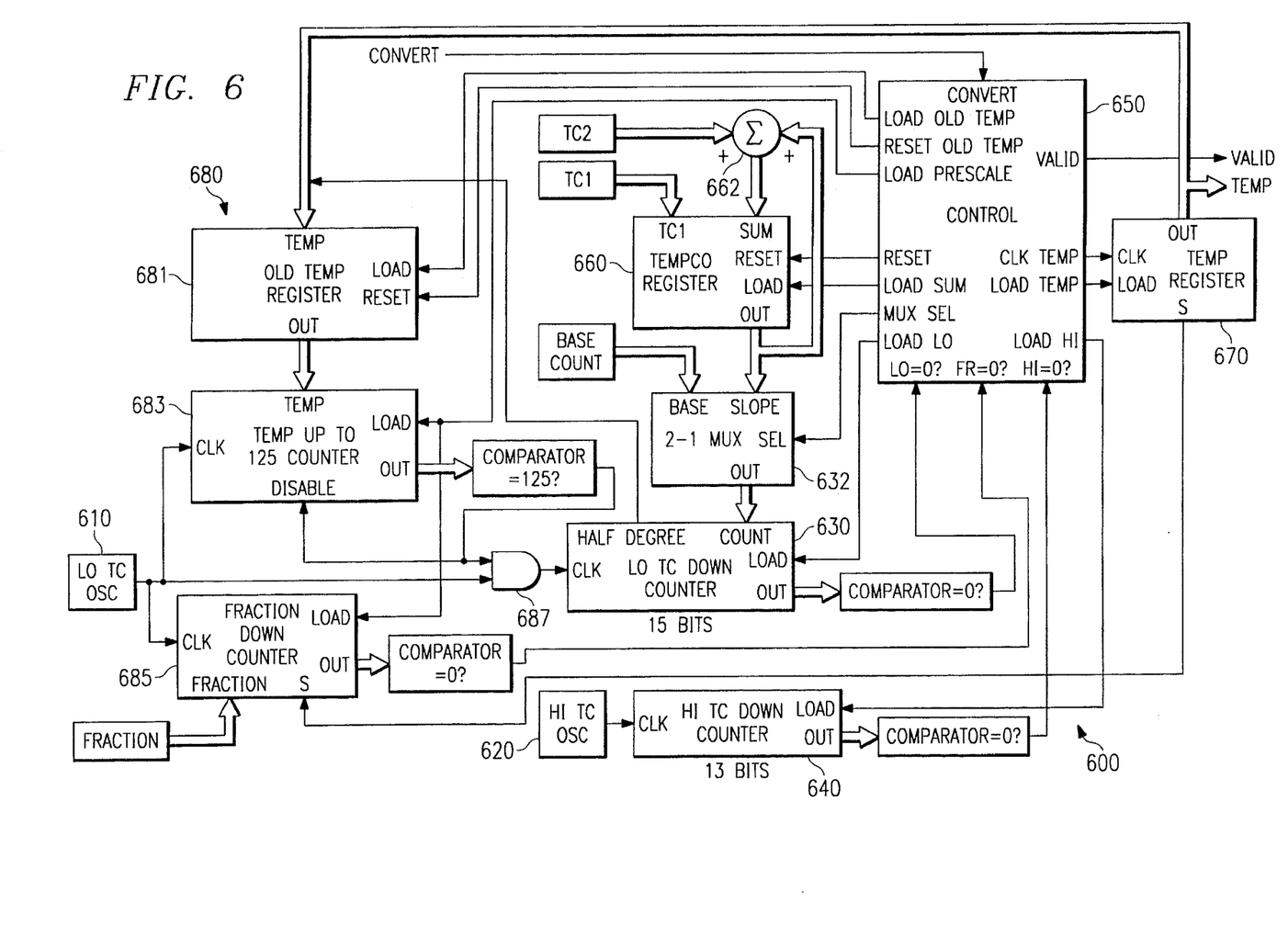
FIG. 6 shows second preferred embodiment detector.

FIG. 6 shows a second preferred embodiment temperature detector, generally denoted by reference numeral 600, which includes low temperature coefficient oscillator 610 (about 200 KHz), high temperature coefficient oscillator 620 (about 100–200 KHz), 15-bit down counter 630, 2-to-1 multiplexer 632, 13-bit down counter 640, controller 650, intercept and slope registers 660, adder 662, output temperature register 670, and prescaler 680 (made of temperature iteration register 681, counter 683, and fractional down counter 685). Each of the down counters has a comparator for indicating when the count reaches 0, counter 683 has a comparator for indication when the count reaches 125 (the maximum temperature). The contents of output temperature register 670 are in 9-bit two's complement format with the least significant bit (LSB) representing 0.5 degree C. Thus register 670 can hold numbers between –128.0 and +127.5, but the temperature contents will always be in the range of –55 to +125. Monitoring the operation of detector 600 at three different temperatures provides calibration and leads to trimming of the operation parameters Base Count, TC1, TC2, and Fraction. The Base Count and TC1 parameters roughly correspond to the b and m parameters of detector 300. In essence, detector 600 numerically integrates a quadratic temperature dependence starting from –55 and using Base Count as the initial value, TC1 as the initial slope and TC2 as the constant slope derivative.

Detector 600 utilizes quadratic approximations as follows. Oscillators 610 and 620 have the architecture shown in FIG. 4 and emulate oscillators 310 and 320 in that oscillator 610 has a polysilicon resistor with resistance about 100 Kohms and oscillator 620 has a diffused resistor with resistance roughly 440 Kohms. The resistance of the oscillator resistors is presumed to have a quadratic temperature dependence over the range −55° to +125° C. The propagation delay through the comparator and flip-flop may also be presumed to have quadratic temperature dependence because this closely fits SPICE simulation results. Thus the oscillation period of each oscillator is quadratic in temperature, and the number of oscillations by oscillator 610 in a time period determined by oscillator 620 oscillating a fixed number of times is the ratio of two quadratic functions of temperature. Detector 600 has two modes of approximating this ratio of quadratics: (1) an overall quadratic fit and (2) the numerator quadratic plus an iterative mode with a linear fit for the denominator quadratic. The following paragraphs discuss the two modes of operation.

The first mode of operation does not employ prescaler 680 and is analgous to the operation of detector 300. First, for calibration the total number of oscillations of oscillator 610 during a count down from $2^{13}$ to 0 by counter 640 is assessed at three different temperatures (such as 10°, 50°, and 90° C.). Then these three data points provide for a quadratic fit for the total number of counts as a function of temperature. That is, the total number of counts during a count down from $2^{13}$ is approximately $$M(T)=C_0+C_1T+C_2T^2$$

Thus substituting in T equal to −55 will give M(−55) as the Base Count (corresponding to b in detector 300), and substituting T equal to −55 in the derivative M'(T)=$C_1$+ $2C_2$T gives M'(−55)=TC1 which is the slope at −55 (corresponding to "m" in detector 300). The slope increment TC2 is just $2C_2$.

Once the parameters Base Count, TC1, and TC2 have been determined and loaded into registers, the first mode of operation of detector 600 proceeds as follows. Down counter 640 has $2^{13}$ loaded and down counter 630 has Base Count loaded by multiplexer 632 selecting Base Count rather than the contents of register 660 (which has TC1 loaded); and −55 is loaded in register 670. Base Count may be on the order of 9000, the slope TC1 may be on the order of 50, and the slope increment may be on the order of 0.2. To avoid roundoff errors, TC1 and TC2 are expressed to an accuracy of $1/128$ (7 fractional binary bits) and sums are truncated when loaded in counter 630. Oscillators 610 and 620 then drive down counters 630 and 640, respectively. When counter 630 reaches 0, controller 650 switches multiplexer 632 to load TC1 (the then-current contents of register 660) into counter 630 which starts counting down again. After loading TC1 from register 660 into counter 630, controller 650 drives register 660 to replace its contents TC1 with the sum TC1+TC2 from adder 662. Then when counter 630 again reaches 0, controller 650 increments the −55 in register 670 and again loads the contents of register 660 (now TC1+TC2) into counter 630, which continues counting down. As with detector 300, each time counter 630 reaches 0, controller 650 increments the temperature in register 670 and drives register 660 to increment its contents by TC2. Thus the contents of register 660 increase to reflect the quadratic approximation, and the successive countdowns by counter 630 slowly increase. Because TC2 is added up 180 times, the $1/128$ accuracy suffices. Also as with detector 300, once counter 640 has counted down from $2^{13}$, the incrementing of the temperature in register 670 ceases and register 670 contains the temperature output.

A comparison of the contents of down counter 630 to the contents of register 660 when counter 640 reaches 0 provides the 0.5 degree bit. In particular, if the contents of down counter 630 is less than half that of register 660, then the 0.5 degree bit is added to output register 670.

Iteration

The second mode of operation of detector 600 uses prescaler 680 to provide a more accurate approximation and to permit iteration to achieve this approximation with minimal hardware. Essentially, the period of oscillator 620 is again approximated by a quadratic and determines the Base Count, TC1, and TC2; and the period of oscillator 610 is approximated by a linear temperature function and is used to block some of the oscillations from oscillator 610 from being counted by counter 630. Indeed, prescaler 680 operates as follows. First, the stream of oscillations from oscillator 610 is partitioned into groups by repetitively counting down in counter 685 from a parameter Fraction to 0; that is, the oscillations are partitioned into groups of size Fraction. Then at the start of each such group of oscillations, counter 683 begins counting up from the current temperature iteration stored in register 681 to +125, and while counter 683 counts up, its comparator output is low and feeds AND gate 687 to block the oscillation stream from counter 630. The temperature thus computed from the nonblocked oscillations appears, as in the overall quadratic approximation description, in register 670; and controller 650 then loads this temperature into register 681 to become the next temperature iteration for counter 683.

In more detail, during one temperature measurement cycle, counter 640 counts down from $2^{13}$ and oscillators 610 and 620 have periods $t_{LO}(T)$ and $t_{HI}(T)$, respectively, so oscillator 610 generates $2^{13}t_{HI}(T)/t_{LO}(T)$ oscillations during the cycle. Note that subscript LO indicates low temperature dependence and HI indicates high temperature dependence. Now if $t_{Lo}$ were independent of temperature and $t_{HI}(T)$ had exactly quadratic temperature dependence, then the counting down by counter 630 with Base Count and TC1 and TC2 would give an exact temperature in register 670.

The quadratic approximation for $t_{HI}(T)$ is good, but $t_{LO}(T)$ increases with temperature by roughly 15% over the range −55° to +125° C. for a polysilicon resistor in oscillator 610. Indeed, $t_{LO}(T)$ may be linearly approximated by $t_{LO}(125)$ $[1-\alpha(125-T)]$ where, as before, $\alpha$ is the temperature coefficient of resistivity for polysilicon and roughly equal to 850 ppm/°C. Then determine Base Count, TC1, and TC2 from the quadratic $2^{13}t_{HI}(T)/t_{LO}(125)$ and use prescaler 680 to block a number of oscillations to compensate for the use of $t_{LO}(125)$ instead of $t_{LO}(T)$. Because counter 683 plus AND gate 687 block 125−T oscillations for each group of oscillations of size Fraction, $\alpha$ determines Fraction as follows. First, the number of oscillations passed by prescaler 680 during one measurement cycle is, disregarding the granularity due to Fraction:

$$[1-(125-T)/\text{Fraction}][2^{13}t_{HI}(T)/t_{LO}(T)]$$

Substituting in the linear approximation for $t_{LO}(T)$ and rearranging yields:

$$\{[\text{Fraction}-(125-T)]/\text{Fraction}\}2^{13}t_{HI}(T)/t_{LO}(125)\alpha(1/\alpha-(125-T))$$

Thus taking Fraction to equal $1/\alpha$(on the order of 1200), the number of oscillations passed just equals $2^{13}t_{HI}(T)/t_{LO}(125)$, which is quadratic with the Base Count, TC1, and TC2 as used before.

The foregoing only presumed temperatures to the nearest degree, but the same procedure works for greater resolution.

In particular, for half-degree resolution, an extra bit would appear in the temperature from register 681, counter 683 would be counting in half-degrees, and Fraction would be doubled.

Figure 7A:
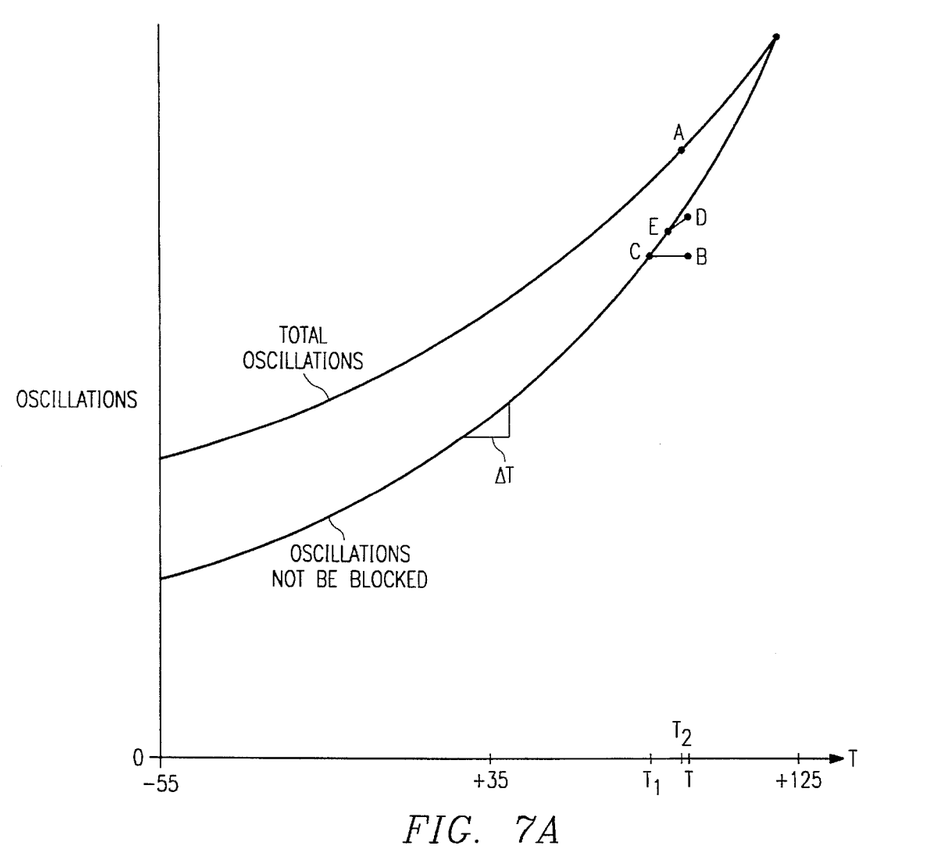
FIGS. 7a–b illustrate iteration in the second preferred embodiment.
Figure 7B:
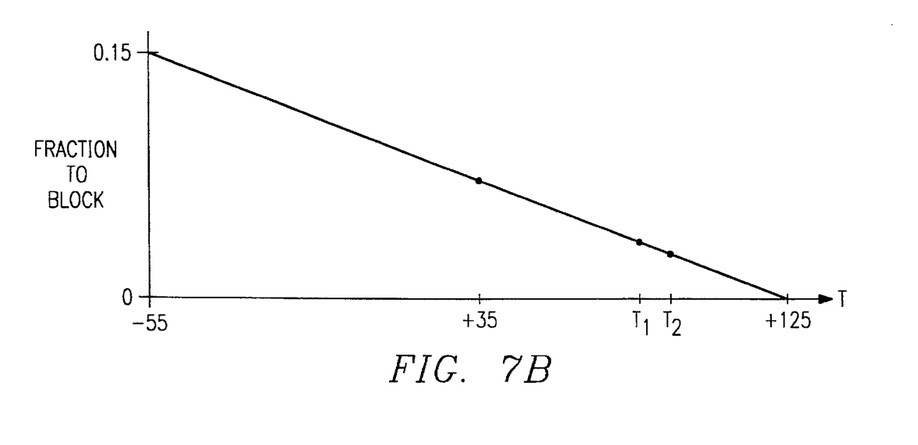

Because counter 683 uses the temperature during computation of the temperature by down counter 630, successive approximation iterations must be used. Take +35 (the midpoint of −55 and +125) as a zeroth order approximation output temperature to load into register 681 and then compute a first order approximation output temperature, $T_1$, in register 670 by a first measurement cycle. Controller 650 then puts $T_1$ into register 681 and a second measurement cycle uses $T_1$ to compute a second order approximation $T_2$ in register 670. Controller 650 iterates five times to yield the final output temperature. FIGS. 7a–b graphically illustrate the successive approximations. Indeed, if the temperature is T, point A in FIG. 7a indicates the number of oscillations from oscillator 610, and point B indicates the number passing through to counter 630 due to the use of +35 in register 681. B falls below the desired curve because too many oscillations are blocked due to the zeroth approximation, +35, being too low. The first order approximation temperature, $T_1$, computed in register 670 follows from point C on the desired curve as shown in FIG. 7a. This implies a smaller fraction to be blocked in during the second measurement cycle as indicated by FIG. 7b, and point D indicates the number passing through to counter 630 in FIG. 7a. The second order approximation temperature, $T_2$, computed in register 670 follows from point E on the desired curve as shown in FIG. 7a. The further approximations lie too close to T to be shown in FIGS. 7a–b. For temperatures below +35, the successive approximations are analogous but converge to T from above the desired curve.

Figure 8:
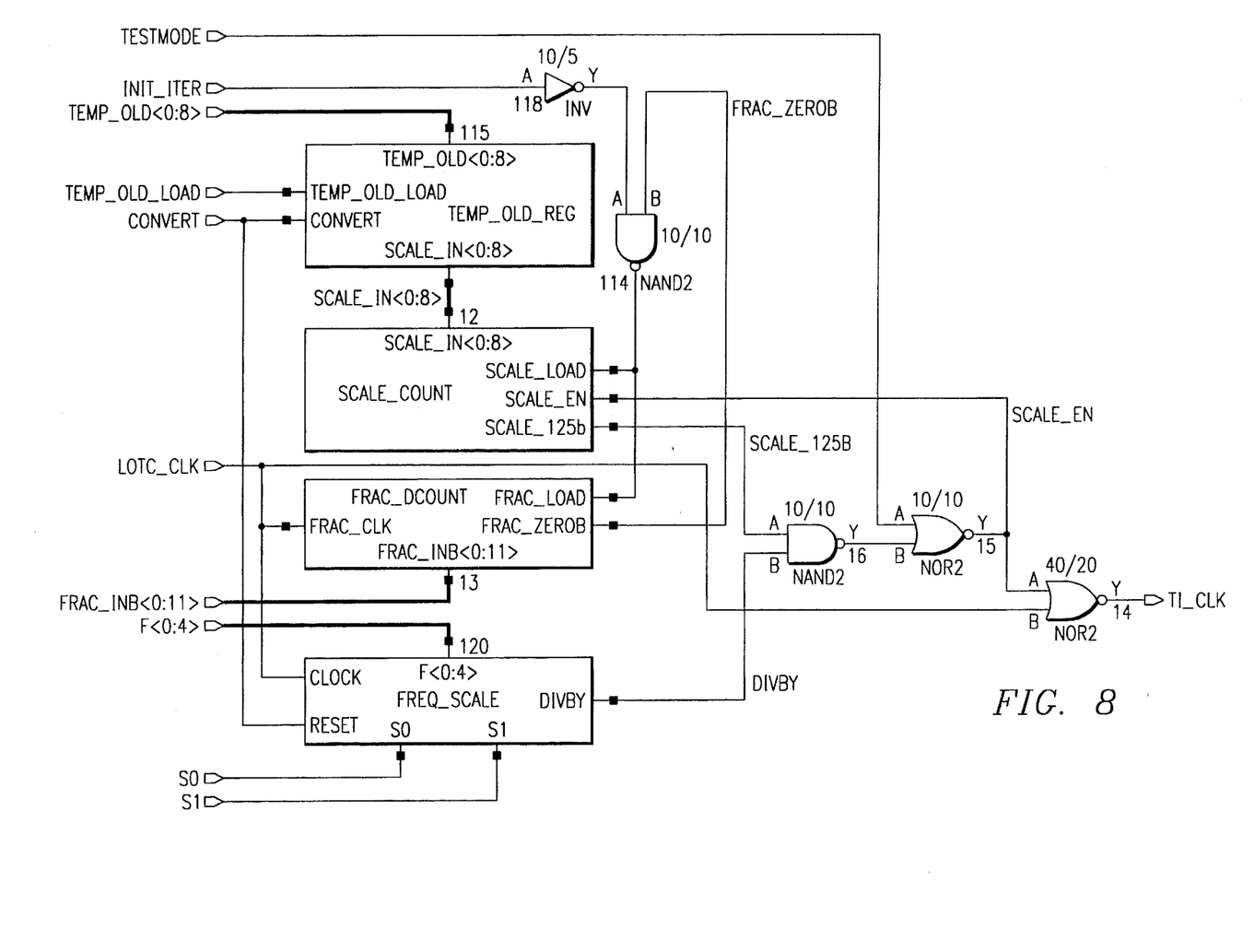
FIG. 8 shows circuitry in FIG. 6.

FIG. 8 shows the circuitry for prescaler 680. Prescaler blocks a certain percentage of input clock pulses, making a scaled clock (ti_clk). Upon initialization, scale_count is loaded with the value corresponding to 35.0 degrees. Then, in a cycle of a calibrated or trimmed length (frac_inb), the appropriate number of pulses are blocked. The cycle is repeated until a new value gets loaded in the scale counter and then the whole process is repeated. Freq_scale is designed, so that the pulse blocking is spread throughout the whole frac_dcount cycle instead of doing all of the pulse blocking at the beginning of each cycle. Note that prescaler 680 actually mitigates the granularity due to the size of Fraction by introducing a new parameter F and spreading out the blocking of oscillations by subgrouping a group of size Fraction into subgroups of size F and blocking only a fixed number from each subgroup according to the following table:

| Last Temperature | Number blocked per size F subgroup |
|---|---|
| −55 ≦ T < −10 | 4 |
| −10 ≦ T < 35 | 3 |
| 35 ≦ T < 80 | 2 |
| 80 ≦ T ≦ 125 | 1 |

Signal line S in FIG. 6 provides the number to be blocked out of each size F subgroup of oscillations to counter 685. F is a trimmed value of up to 31 and is chosen to be the maximum integer less than 4Fraction/360 for the case of half-degree resolution (360 is the number of half degrees in the range −55° to +125° C.). For example, if the temperature is +10° C. and Fraction =2500 (half-degree resolution with α roughly 800 ppm/°C.), F would be 27. The total number of oscillations blocked per group of size Fraction (2500) would be 230, and 3 out of every 27 would be blocked until the total reached 230. That is, the first 2052 (=27×76) oscillations in a group of 2500 (Fraction) would have 3× 76=228 blocked, the next 27 would have 2 blocked to reach the 230 total, and the remaining 421 would not have any blocked.

This mitigates the granularity due to Fraction, as can be seen by continuing the example. First, presume that oscillator 610 puts out a total of 11,000 oscillations during one measurement cycle (a $2^{13}$ count down by counter 640). Because 230 oscillations are blocked out of each 2500, the first 10,000 (=4×2500) oscillations will have 920 (=4×230) blocked. Then, ideally during the last 1000 oscillations, 1000×230/2500=92 should be blocked. But prescaler 680 block 3 out of every 27, so 111 (=3×37) will be blocked because 37 subgroups of size 27 fit into the last 1,000 with remainder 1. Thus the error would be a count of 111−92=19, and this is roughly a 0.2 degree error when TC1 is about a typical 100. Without this spreading, the error would be much greater. In particular, if the 230 oscillations to be blocked out of each 2500 are the first 230, then in this example, 230 out of the last 1000 would have been blocked and the error would have been 230−92=138, which translates to roughly 1.4 degree for TC1 about 100.

Calibration

The calibration of temperature detectors 300 and 600 to set the parameters (b and m for detector 300 and Base Count, TC1, TC2, Fraction, and F for detector 600) proceeds simply by holding a detector in a temperature controlled chamber (with temperature being measured) while the oscillators 310 and 320 or 610 and 620 run and the number of oscillations or the frequency is measured in a test mode at three different temperatures (such as the 10°, 50°, and 90° C. previously noted). The parameters are then computed and entered into the detector and may reside in EPROM or other nonvolatile memory. This calibration occurs after packaging of the integrated circuit.

Further Modifications and Variations

The preferred embodiments may be modified in many ways while retaining one or more of the features of a temperature-to-time conversion followed by a digitizing of the time to yield a digital temperature measurement and an iterative approach for using a temperature dependent adjustment (such as oscillation blocking) for computing a temperature.

For example, the temperature-to-time converter 320–340 of FIG. 3 could be replaced by a simple delay line made of field effect transistors; carrier mobility and saturation currents decrease with temperature and thus delays increase and again lead to longer count times for oscillator 310. Thus an enable signal would start counter 330 and enter the delay line; after a temperature dependent delay, the signal would emerge from the delay line and disable counter 330. Similarly, the time interval could be converted to a voltage for analog control by having a current with small temperature dependence charge up a capacitor with small temperature dependence for the time interval.

Further examples include modifying the prescaler 680 of FIGS. 6 and 8 for nonlinearity by using a lookup table (EPROM) to determine the number of oscillations to block for a given approximation temperature; that is, register 681 would drive the address of the lookup table and the output would be the count for counter 683.

The overall quadratic approximation mode of detector 600 which does not use prescaler could be enchanced to a cubic approximation by calibration at four temperatures and using an additional parameter TC3 (a third derivative) plus another feedback plus adder to increment TC2 by TC3 on each reloading of counter 630. Even higher order approximations could be used, although the errors in calibration due to items such as inaccurate temperature chamber temperatures, internal rounding errors, and so forth limit the usefulness of high order approximations.

What is claimed is:

1. A temperature detector, comprising:
   (a) a temperature-to-time first converter, said temperature-to-time first converter outputting a time interval with length depending upon an input temperature;
   (b) a time-to-number second converter, said time-to-number second converter with input coupled to receive said time interval outputted by said temperature-to-time first converter, said time-to-number second converter approximates a number version of said input temperature by fitting a linear model to said time interval and outputs said number version of said input temperature;
   (c) said temperature-to-time first converter including a first oscillator with a temperature dependent period coupled to a first counter for providing a temperature dependent time interval, said time interval for said first counter determined by the number of oscillations counted for a predetermined count; and
   (d) said time-to-number second converter including a second oscillator coupled to a time-to-number second counter, with said time-to-number second counter in response to said second oscillator input producing a digital number during said time interval of said first counter.

2. The temperature detector of claim 1, wherein said temperature-to-time first converter and said time-to-number second converter are combined into an integrated circuit.

3. The temperature detector of claim 1, further wherein said time-to-number second converter has at least one output terminal, said at least one output terminal coupled to an electrical device selected from the group consisting of microcontrollers and microprocessors, and/or any combination thereof.

4. The temperature detector of claim 1, wherein said number version outputted by said time-to-number second converter is a binary representation of said temperature detector in standard units of measurement of temperature.

5. The temperature detector of claim 1, wherein said second oscillator of said time-to number second converter is not variable.

6. The temperature detector of claim 4, wherein said standard units of measurement of temperature are Celsius degrees.

7. The temperature detector of claim 1 further comprising:

(c) control circuitry coupled to said temperature-to-time first converter and to said time-to-number second converter to activate said temperature-to-time first converter and said time-to-number second converter and to synchronize communication between said temperature-to-time first converter and to said time-to-number second converter.

8. The temperature detector of claim 1, wherein said time-to-number second converter is continuously running.

9. The temperature detector of claim 1, wherein said input temperature sensed by a temperature sensor ranges between a first temperature and a second temperature, said first temperature is approximately equal to −55 degrees Celsius and said second temperature is approximately equal to +125 degrees Celsius.

10. A thermometer embedded in a single integrated circuit, comprising:
    (a) delay circuitry to produce a signal delayed by a length of time corresponding to a temperature output sensed by a temperature sensor;
    (b) said delay circuitry including a first oscillator to generate oscillations at a first oscillation rate, said first oscillation rate having a sensitivity to temperature, and a first counter coupled to said first oscillator to count said oscillations for a predetermined count to determine said length of time;
    (c) timing circuitry coupled to receive said signal, said timing circuitry fits a linear mathematical model to said signal to generate a digital output corresponding to said temperature output; and
    (d) said timing circuitry including a second oscillator to generate oscillations at a second oscillation rate, said second oscillation rate having an insensitivity to temperature, and a second counter coupled to said first counter of said delay line circuitry to count said oscillations generated by said second oscillator to produce a digital number during said length of time determined by said first counter.

11. The thermometer of claim 10, further comprising:
    (c) control circuitry coupled to said timing circuitry and to said delay circuitry to activate said delay circuitry and said timing circuitry and synchronize all communication between said timing circuitry and said delay circuitry.

12. The thermometer of claim 10, wherein said timing circuitry has a reset as to turn on and off said timing circuitry.

13. The thermometer of claim 10, wherein said timing circuitry and said delay circuitry are powered by a battery.

* * * * *

UNITED STATES PATENT AND TRADEMARK OFFICE
CERTIFICATE OF CORRECTION

PATENT NO. : 5,513,235
DATED : Apr. 30, 1996
INVENTOR(S) : Douglass et al.

It is certified that error appears in the above-indentified patent and that said Letters Patent is hereby corrected as shown below:

Column 2, line 63   Replace "0f"
With --Of--

Column 3, line 33   Replace "$[V_0(V_0-V_C)]$"
With --"$[V_0/(V_0-V_C)]$"--

Column 3, line 48   Replace "$M(T)=N\{R_{HI}[1+\alpha\Delta T]C_{HI}\ln[V_0/(V_0-V_C)]+K_{HI}\}/\{R_{LO}C_{LO}\ln[V_0/(V_0-V_C)]+K_{LO}\}$"

With --$M(T)=N\{R_{HI}[1+\alpha\Delta T]C_{HI}\ln[V_0/(V_0-V_C)]+K_{HI}\}/\{R_{LO}C_{LO}\ln[V_0/(V_0-V_C)]+K_{LO}\}$--

Column 6, line 36   Replace "$t_{Lo}$"
With --$t_{LO}$--

Column 8, line 14   Replace "block"
With --blocks--

Signed and Sealed this

Thirteenth Day of May, 1997

Attest:

BRUCE LEHMAN

*Attesting Officer*   *Commissioner of Patents and Trademarks*